US006088339A

United States Patent [19]

Meyer

[11] Patent Number: 6,088,339

[45] Date of Patent: Jul. 11, 2000

[54] APPARATUS AND METHOD FOR PROGRAMMING A HEARING AID USING A SERIAL BIDIRECTIONAL TRANSMISSION METHOD AND VARYING CLOCK PULSES

[75] Inventor: Wolfram Meyer, Moehrendorf, Germany

[73] Assignee: Siemens Audiologusche Technik GmbH, Erlangen, Germany

[21] Appl. No.: 08/984,060

[22] Filed: Dec. 3, 1997

[30] Foreign Application Priority Data

Dec. 9, 1996 [DE] Germany .......................... 196 51 126

[51] Int. Cl.[7] .............................. H04L 5/16; H04R 25/00

[52] U.S. Cl. ............................................ 370/296; 381/314

[58] Field of Search .................................... 370/503, 522, 370/246, 296, 527, 529; 381/312, 314, 323, 320, 321

[56] References Cited

U.S. PATENT DOCUMENTS

| | | | |
|---|---|---|---|
| 3,993,867 | 11/1976 | Blood, Jr. . | |
| 4,731,850 | 3/1988 | Levitt et al. | 381/68.2 |
| 4,947,433 | 8/1990 | Gebert | 381/68 |
| 5,197,332 | 3/1993 | Shennib | 73/585 |
| 5,386,684 | 2/1995 | Simon et al. . | |
| 5,402,494 | 3/1995 | Flippe et al. | 381/69.2 |
| 5,515,443 | 5/1996 | Meyer . | |
| 5,606,620 | 2/1997 | Weinfurtner | 381/68.2 |

*Primary Examiner*—Douglas W. Olms
*Assistant Examiner*—David R Vincent
*Attorney, Agent, or Firm*—Hill & Simpson

[57] ABSTRACT

In a data transmission method and circuit for communication between a programming apparatus and a user apparatus to be programmed, such as a hearing aid, data as well as clock pulses are transmitted by the programming apparatus to the user apparatus for the individual adjustment of application-specific data of the user apparatus. The data and clock pulses are transmitted in half-duplex operation using a single signal line. Differently fashioned clock pulses of an outgoing signal with digital information are supplied to the signal line, and the digital information is recovered at the user apparatus by means of clock pulse variation, and the recovered information is subsequently processed with the transmitted clock pulse.

27 Claims, 4 Drawing Sheets

APPARATUS AND METHOD FOR PROGRAMMING A HEARING AID USING A SERIAL BIDIRECTIONAL TRANSMISSION METHOD AND VARYING CLOCK PULSES

BACKGROUND OF THE INVENTION

1. Field of the Invention

The present invention relates to a serial, bidirectional data transmission method for communication between a programming apparatus and a user apparatus to be programmed, in particular a hearing aid, and a circuit for implementing the data transmission method. In addition, the present invention relates to a hearing aid using such a circuit.

2. Description of the Prior Art

Known data transmission methods of the above type between a programming apparatus and a user apparatus require a number of connecting leads. The interface specified in German 43 21 788 for serial data transmission between a hearing aid and a control apparatus has several data connecting leads for bidirectional data transmission. This known interface requires a first data connection for bidirectional transmission to or from the hearing aid, as well as a second data connection for a data format sent by the control apparatus with a start bit, in addition to a third data connection for the data to be received from the control apparatus. The use of multiple connecting leads produce an increased susceptibility to disturbances due to longer signal paths in the programming of user apparatuses, and also are considered to be disturbing by the users of the apparatuses, particularly in the programming of hearing aids.

From German AS 25 43 130, a circuit arrangement is known for the transmission of digital data in full duplex operation between at least two stations. According to this circuit arrangement for transmitting digital data in full duplex operation, the simultaneous transmission and reception of data via a single signal line, and a number of stations, provided respectively with at least one transmission means and one receiver, can be connected. The known circuit arrangement is directed to the task of simultaneously transmitting outgoing signals, receiving incoming signals and shielding the respective receiver of a station against signals going out from the transmitter of the same station, all via a single signal line by means of a driver circuit of a specific construction.

SUMMARY OF THE INVENTION

An object of the present invention is to provide a data transmission method of the type initially described for communication between a programming apparatus and a user apparatus to be programmed, in particular a hearing aid, a circuit for implementing the method, and a hearing aid embodying this circuit, which allow some of the number of connecting leads to be effectively reduced to a single signal line.

This object is achieved in an inventive data transmission method wherein, using a single signal line for data transmission in half duplex operation, differently constructed clock pulses of an outgoing signal with digital information are applied to the signal line, the digital information is recovered at the user apparatus by means of the variation among the clock pulses and is subsequently processed with the transmitted clock pulse. The inventive data transmission method makes it possible, based on the variation of the clock pulses, to transmit digital information via the signal line charged with the clock pulses, so that the number of connecting leads can be reduced. In the invention, an optional operation of the data transmission by the programming apparatus to the user apparatus or vice versa is possible. A data exchange according to the half duplex method is thus present, because the data transmission does indeed ensue in both directions, but not at the same time. In the data transmission method according to the invention, there ensues a compression and encryption of the data information of the respective individual transmitted signals.

In an embodiment, the signal line for the transmission of the clock impulses is used not only for the transmission of the data from the programming apparatus to the user apparatus, but also for the reception of the data of the user apparatus at the programming apparatus, i.e. for reading the transmitted data.

In another embodiment of the present invention, a clock pulse amplitude variation is used as the clock pulse variation. Dependent on the level of the clock pulse amplitude, items of information can thus be written to the user apparatus by the programming apparatus via the signal line.

The clock pulses can be attenuated in amplitude at the programming apparatus, and, from the amplitude attenuation of the clock pulse, the information emitted by the programming apparatus is recovered at the user apparatus and is further processed therein.

In addition, according to the invention a programming voltage impulse is transmitted to the user apparatus via the clock signal line, as soon as the communication between the programming apparatus and the user apparatus is concluded. With the programming voltage pulse, the transmitted items of information are stored in the memory of the user apparatus.

For the transmission of information from the user apparatus back to the programming apparatus, the amplitude of the clock pulses likewise can be attenuated at the user apparatus, and from the amplitude attenuation of the clock pulses the items of information emitted by the user apparatus can be recovered and further processed in the programming apparatus. By means of the clock pulse attenuation, data transmitted to the user apparatus by the programming apparatus can thus be tested, and/or data can be read in.

Alternatively, in a further embodiment of the inventive data transmission method, clock pulse frequency variation is employed as clock pulse variation.

If clock pulse frequency variation is used, the programming of the user apparatus can ensue in wireless fashion. In view of this possibility, the term "signal line" as used herein has a generic measuring of a signal path or communication path, not necessarily a hard-wired connection. A method of this sort ensures optimum programming and handling convenience.

The clock pulse frequency variation can advantageously be carried out using a carrier frequency $f_0$ on which a clock pulse frequency $f_1$ is superimposed. In an item of information to be transmitted, the clock pulse frequency $f_1$ is modified to a clock pulse frequency $f_2$, or an additional clock pulse frequency $f_2$ is superimposed on the clock pulse frequency $f_1$.

Alternatively, the transmission of the information can ensue by means of a controlled on/off switching of a carrier frequency, using the so-called "frequency gating method." The inventive data transmission method can be used with a number of user apparatuses to be programmed, and has the advantage that it is not necessary to address every bit, which considerably simplifies the programming of the individual user apparatuses, particularly in the programming of hearing aids. In the embodiment employing clock signal frequency variation, standardized radio modules can be used. This is of enormous significance for hearing aids, in which the highest possible degree of miniaturization is important.

DESCRIPTION OF THE PREFERRED EMBODIMENTS

Figure 1:
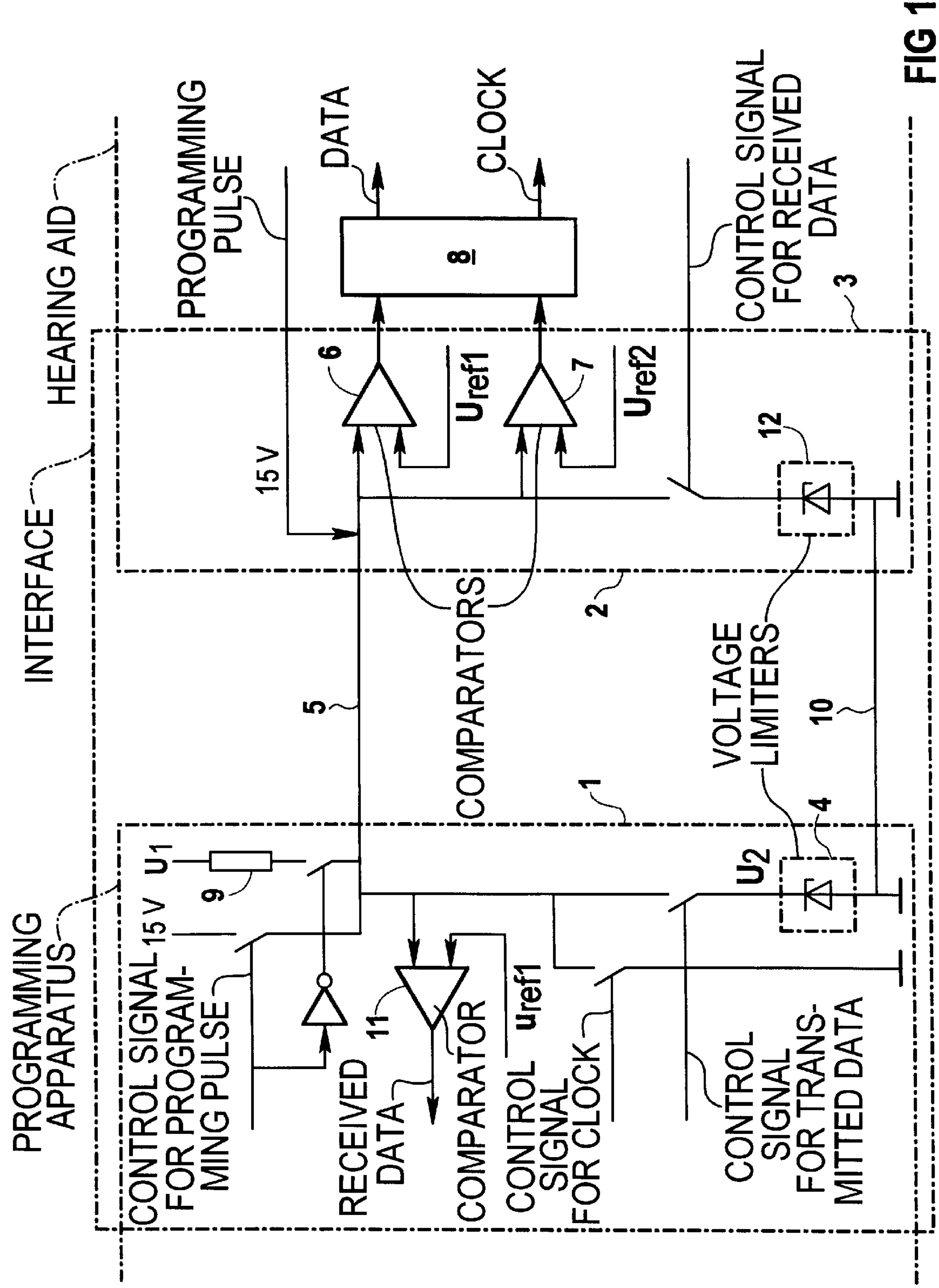
FIG. 1 shows a simplified schematic diagram for a circuit operating according to the inventive data transmission method, using a clock pulse amplitude variation.

FIG. 1 shows a circuit for realizing the inventive data transmission method between a programming apparatus 1 and a hearing aid 2. The individual circuit components can be housed respectively in the programming apparatus 1 or in the hearing aid 2, or in a separate interface 3.

The programming apparatus 1 and the hearing aid 2 are connected via a single signal line 5. In addition, there exists a further connection via a reference potential line 10. The signal line 5 and reference potential line 10 are advantageously combined in a common programming cable (not shown).

At the programming apparatus 1, the signal line 5 is applied to a pull-up resistor 9. In addition, electronic components for setting the signal voltage, as well as a comparator 11, are connected with the signal line 5 at the programming apparatus 1. The comparator 11 is supplied with a reference voltage $U_{ref1}$.

A voltage limiter 4, for limiting the voltage $U_2$ applied to the signal line 5, can likewise be connected with the signal line 5. The voltage $U_1$ of the pull-up resistor 9 is larger than the voltage $U_2$ of the voltage limiter 4.

At the hearing aid 2, a comparator 6, which is also supplied with the reference voltage $U_{ref1}$, and a comparator 7, which is applied to a voltage $U_{ref2}$, are connected with the signal line 5.

In addition, a voltage limiting circuit 12 can be applied to the signal line 5 at the hearing aid 2, given a control signal for receive data from the memory. The two comparators 6 and 7 are connected to a standard shift register circuit 8.

The inventive transmission method is characterized in that, at the programming apparatus 1, clock pulses with amplitudes of different levels are transmitted on the signal line 5 in FIG. 1. From the clock amplitude level, the information 1 or 0 is obtained at the hearing aid 2, and is further processed synchronously with the transmitted clock pulse.

At the programming apparatus 1, the signal line 5 is at the voltage $U_1$ via the pull-up resistor 9. By activation of the voltage limiter 4, the amplitude of the clock pulse emitted at the programming apparatus 1 is varied between a first voltage $U_1$ and a second, smaller voltage $U_2$, according to the information to be transmitted. Via the output signals of the two comparators 6 and 7 provided at the hearing aid 2, as well as the shift register 8 connected therewith, the incoming information is recovered in the hearing aid 2 and is further processed.

Figure 2:
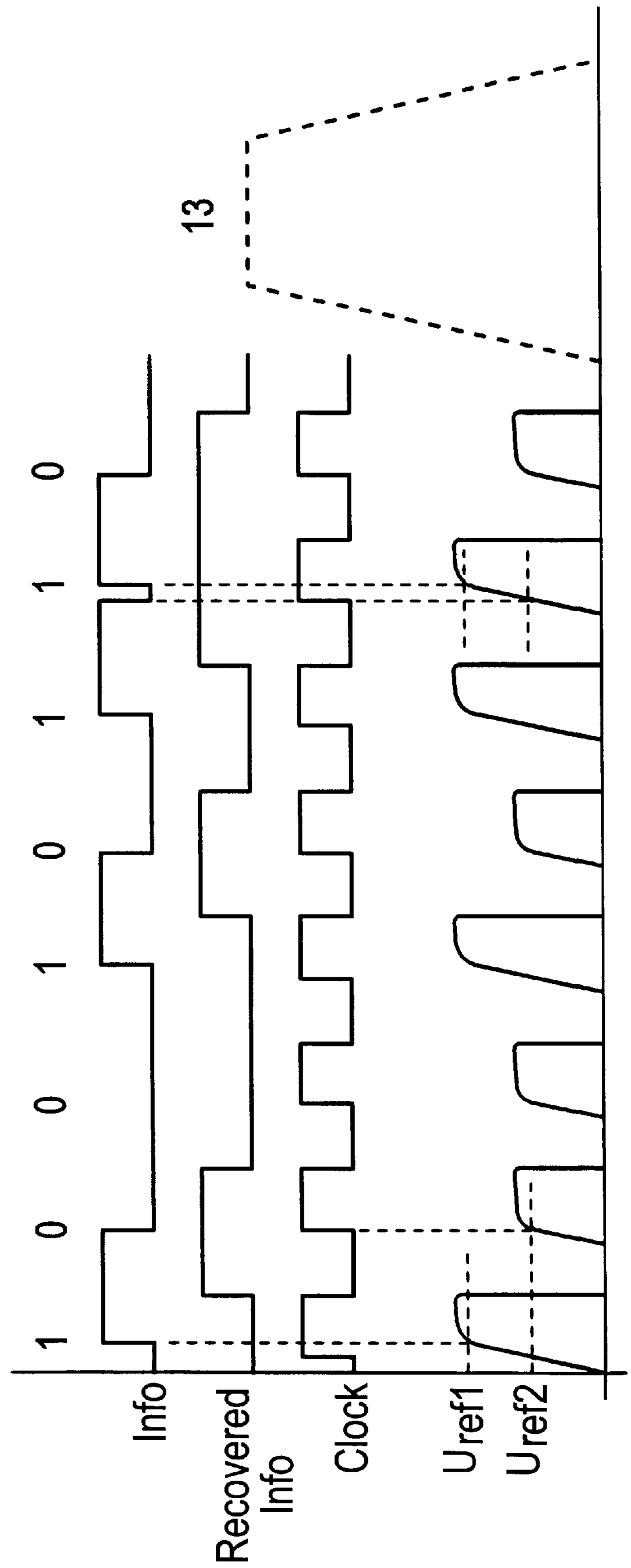
FIG. 2 shows various pulse diagrams of a communication between a programming apparatus and a hearing aid, in accordance with the invention using a clock pulse amplitude variation.

From the pulse diagram according to FIG. 2, it can be seen that the information is recovered into the shift register 8 by means of the second pulse edge. The resetting of the information ensues at the next pulse edge, independently of the amplitude of the respective clock impulse. By this means, the information concerning the range of the time of takeover into the shift register 8 remains stored, so that unambiguous relations to the time of evaluation are present.

For the transmission of the information from hearing aid 2 back to the programming apparatus 1, the clock pulses transmitted by the programming apparatus 1, which were employed to recover the information present in the hearing aid 2, are attenuated in their amplitude by means of the voltage limiting circuit 12 activated at the hearing aid 2. From this amplitude attenuation of the clock pulses, the information emitted by the hearing aid 2 is recovered at the programming apparatus 1 via the comparator 11 and is further processed in the programming apparatus 1. After the communication between the programming apparatus 1 and the hearing aid 2, the programming apparatus 1 applies the programming voltage pulse 13 (cf. FIG. 2) to the signal line 5.

Figure 3:
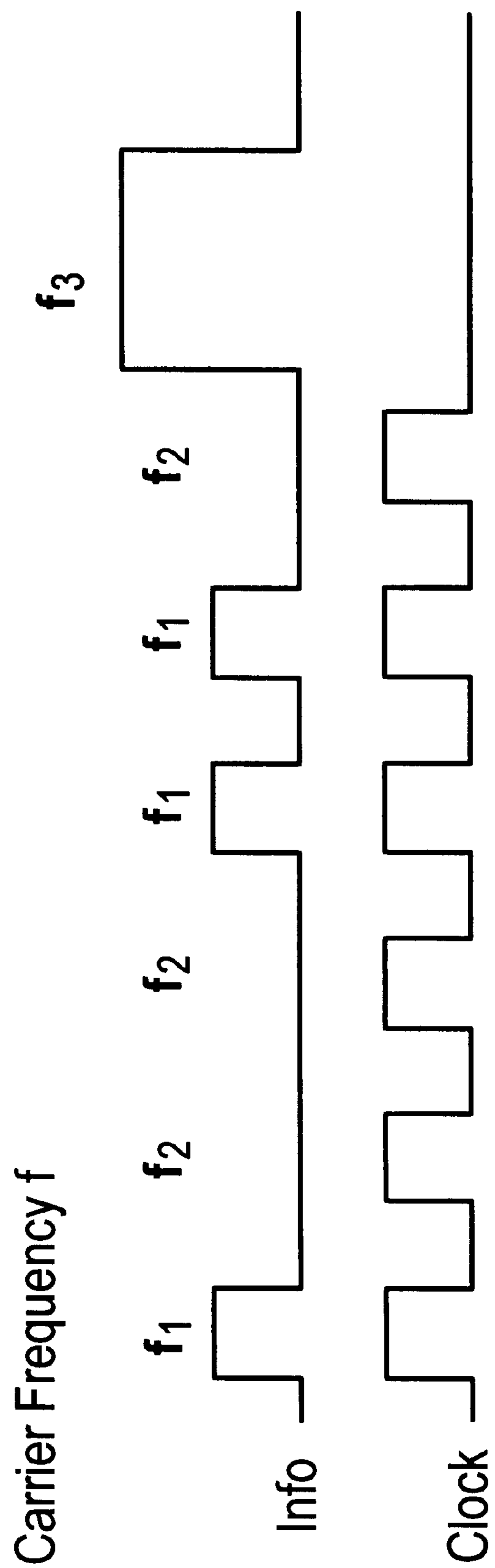
FIG. 3 shows an impulse diagram of a communication between a programming apparatus and a hearing aid in accordance with the invention, using clock pulse frequency variation.

According to a further embodiment of the present invention, the principle of the data transmission method using a clock pulse variation can also be realized using clock pulse frequency variation (cf. FIG. 3). At the programming apparatus 1, clock pulses with different frequencies ($f_1$ for information 1, $f_2$ for information 0) are transmitted by the programming apparatus 1 to the hearing aid 2. The transmission preferably ensues in wireless fashion, using a carrier frequency $f_0$. The programming pulse can, for example, be triggered by an additional frequency $f_3$. For the transmission of information, the frequency gating method used in mobile radiotelephony can be employed.

Figure 4:
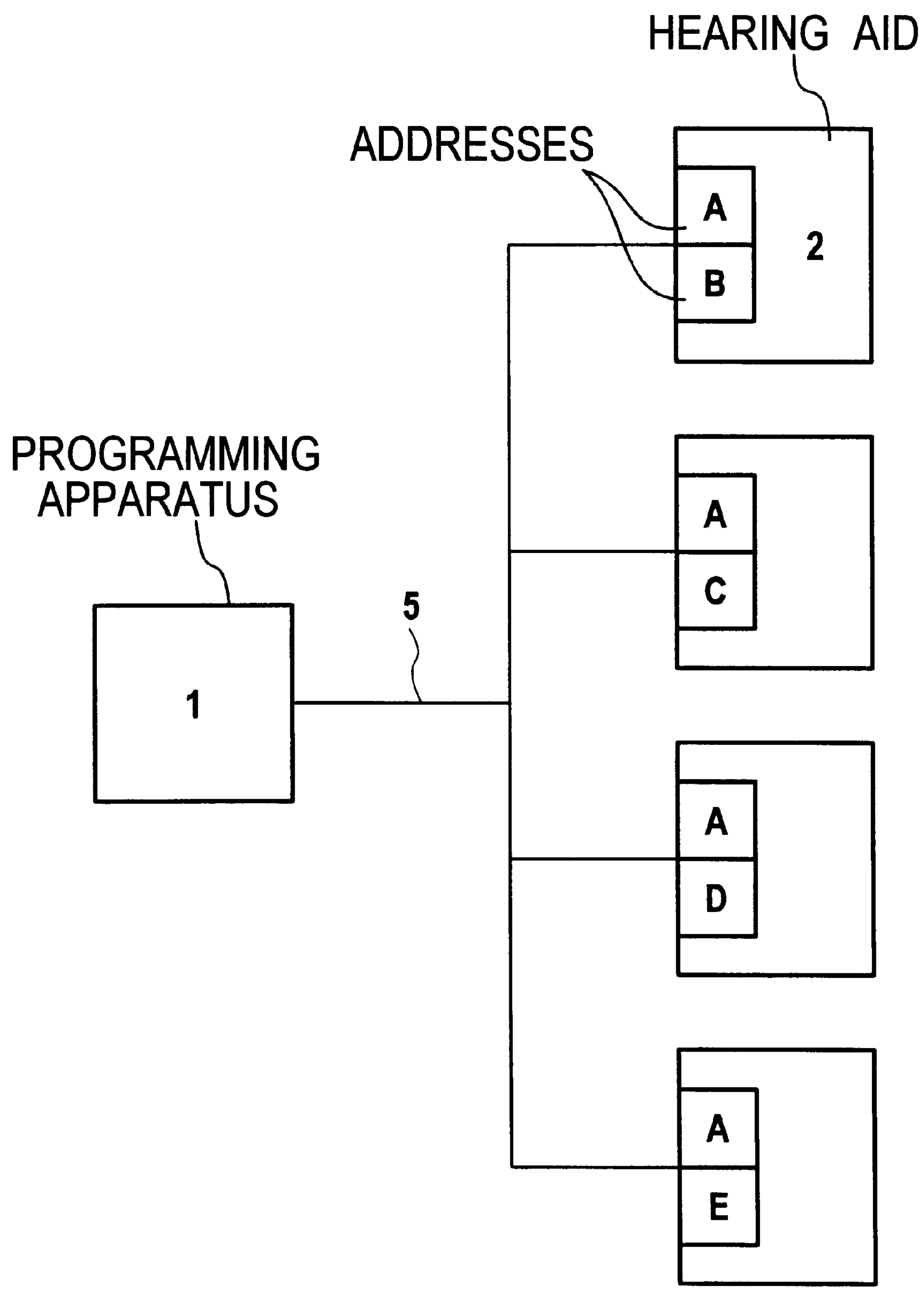
FIG. 4 shows a simplified block switching diagram of an embodiment of the inventive data transmission method, in which several hearing aids are programmed by one programming apparatus.

FIG. 4 shows an arrangement of a programming apparatus 1 and several hearing aids 2 to be programmed, of which, for clarity, only one is provided with the reference character 2. Each programming apparatus 1 has a total of two addresses, with one address (address A) being provided by the programming apparatus 1 for a uniform inhibiting signal. The respective second address B, C, D and E serve to address the desired hearing aid 2 with a corresponding signal, and to carry out the specific programming. After the programming of the activated hearing aid 2, there ensues at the programming apparatus 1 an inhibit command in the form of the inhibit signal, with which all the hearing aids 2 are again inhibited.

The embodiment of the data transmission method shown in FIG. 4 has the advantage that it is not necessary to address each bit separately, which greatly simplifies the programming of the individual hearing aids 2 as well as the equipping thereof in terms of hardware. This is of great significance in hearing aids, in which the highest possible degree of miniaturization is important. The embodiment according to FIG. 4 can be applied both to clock pulse amplitude variation, in which a signal line 5 has to be provided, and to a clock pulse frequency variation, in which a wireless transmission ensues.

Although various minor modifications might be suggested by those skilled in the art, it should be understood that I wish to embody within the scope of the patent warranted hereon all such modifications as reasonably and properly come with the scope of my contribution to the art.

I claim as my invention:

1. A serial bidirectional data transmission method for communication between a programming apparatus and a user apparatus to be programmed, comprising the steps of:

providing a programming apparatus and at least one user apparatus remote from said programming apparatus, said user apparatus containing components requiring individual adjustment with programming data;

connecting said programming apparatus and said user apparatus with a single signal line;

transmitting said programming data and respectively different clock pulses via said single signal line from said programming apparatus to said user apparatus;

recovering said programming data at said user apparatus dependent on variation of said respectively different clock pulses and processing said programming data at said user apparatus together with said clock pulses.

2. A data transmission method as claimed in claim 1 comprising the additional steps of:

upon receiving said programming data and said respectively different clock pulses at said user apparatus, operating on said respectively different clock pulses at said user apparatus to produce further-varied clock pulses;

transmitting said further-varied clock pulses from said user apparatus to said programming apparatus together with the programming data received by the user apparatus from the programming apparatus; and recovering said programming data transmitted from the user apparatus to the programming apparatus, as a confirmation of correct receipt at the user apparatus, using said further-varied clock pulses.

3. A data transmission method as claimed in claim 1 comprising producing said respectively different clock pulses by producing clock pulses having respectively different amplitudes.

4. A data transmission method as claimed in claim 3 wherein the step of producing clock pulses with respectively different amplitudes comprises damping the amplitude of each clock pulse by a different amount at said programming apparatus before transmission to said user apparatus, and wherein the step of recovering said programming data includes identifying said amount of damping at said user apparatus for recovering said programming data.

5. A data transmission method as claimed in claim 4 wherein the step of damping the respective amplitudes of said clock pulses comprises:

placing said single signal line at a first voltage;

varying the respective amplitudes of the clock pulses transmitted from the programming apparatus to the user apparatus between said first voltage and a second, smaller voltage using a voltage limiting circuit;

identifying a data state when a reference voltage level is exceeded and storing the data state until a next clock pulse in a shift register using a trailing pulse edge of each clock pulse.

6. A data transmission method as claimed in claim 1 comprising the additional step of:

after transmitting said programming data and said clock pulses from said programming apparatus to said user apparatus, transmitting a programming voltage pulse on said single signal path from said programming apparatus to said user apparatus.

7. A data transmission method as claimed in claim 1 comprising the additional steps of:

upon receiving said programming data and said respectively different clock pulses at said user apparatus, operating on said respectively different clock pulses at said user apparatus to produce further-varied clock pulses;

transmitting said further-varied clock pulses from said user apparatus to said programming apparatus together with the programming data received by the user apparatus from the programming apparatus;

recovering said programming data transmitted from the user apparatus to the programming apparatus, as a confirmation of correct receipt at the user apparatus, using said further-varied clock pulses;

producing said further-varied clock pulses at said user apparatus by damping respective amplitudes of clock pulses at said user apparatus by respectively different amounts; and recovering said programming data at said programming apparatus depending on the differently damped clock pulses sent to the programming apparatus from the user apparatus.

8. A data transmission method as claimed in claim 1 comprising the step of producing said respectively different clock pulses by clock pulse frequency variation.

9. A data transmission method as claim in claim 8 wherein the step of connecting said programming apparatus and said user apparatus via a single signal line comprises establishing a wireless signal line between programming apparatus and said user apparatus.

10. A data transmission method as claimed in claim 8 wherein the step of producing said respectively different clock pulses using clock pulse frequency variation comprises the steps of:

superimposing a clock pulse frequency on a carrier frequency at said programming apparatus; and before transmitting said clock pulses from said programming apparatus to said user apparatus via said carrier frequency, varying said clock pulse frequency.

11. A data transmission method as claimed in claim 8 wherein the step of producing said respectively different clock pulses using clock pulse frequency variation comprises the steps of:

superimposing a clock pulse frequency on a carrier frequency at said programming apparatus; and before transmitting said clock pulses from said programming apparatus to said user apparatus via said carrier frequency, superimposing a further clock pulse frequency on said clock pulse frequency.

12. A data transmission method as claimed in claim 8 wherein the step of producing said different clock pulses using clock pulse frequency variation comprises employing a frequency gating method for producing said clock pulse frequency variation.

13. A data transmission method as claimed in claim 1 wherein the step of providing at least one user apparatus comprises providing a plurality of user apparatuses to be programmed by said programming apparatus and connecting each of said user apparatuses to said programming apparatus via a single signal line;

allocating a receiver having at least a first address and a second address to each user apparatus;

transmitting a signal from said programming apparatus to all of said user apparatuses at the respective first addresses for disenabling said user apparatuses and transmitting a signal to the second address of a user apparatus to be activated and subsequently transmitting said programming data and said clock pulses to said user apparatus to be activated, and subsequently transmitting said programming data and said clock pulses to said user apparatus to be activated, and thereafter again disenabling said user apparatus to be activated after transmitting said programming data and said clock pulses.

14. A data transmission method as claimed in claim 1 wherein the step of providing at least one user apparatus comprises providing at least one hearing aid as said user apparatus.

15. A serial bidirectional data transmission system comprising:

a programming apparatus;

at least one user apparatus remote from said programming apparatus, said user apparatus containing components requiring individual adjustment with programming data;

a single signal communication path between said programming apparatus and said user apparatus;

means in said programming apparatus for transmitting said programming data and respectively different clock pulses via said single signal path from said programming apparatus to said user apparatus; and means at said user apparatus for recovering said programming data dependent on variation of said respectively different clock pulses and means for processing said programming data at said user apparatus together with said clock pulses.

16. A data transmission system as claimed in claim 15 comprising:

means at said user apparatus for, upon receiving said programming data and said respectively different clock pulses, operating on said respectively different clock pulses to produce further-varied clock pulses;

means at said user apparatus for transmitting said further-varied clock pulses from said user apparatus to said programming apparatus together with the programming data received by the user apparatus from the programming apparatus; and means at said programming apparatus for recovering said programming data transmitted from the user apparatus to the programming apparatus, as a confirmation of correct receipt at the user apparatus, using said further-varied clock pulses.

17. A data transmission system as claimed in claim 15 comprising means for producing said respectively different clock pulses by producing clock pulses having respectively different amplitudes.

18. A data transmission system as claimed in claim 17 wherein said means producing clock pulses with respectively different amplitudes comprises means for damping the amplitude of each clock pulse by a different amount at said programming apparatus before transmission to said user apparatus, and wherein said means for recovering said programming data includes means identifying said amount of damping at said user apparatus for recovering said programming data.

19. A data transmission system as claimed in claim 18 wherein said single signal path comprises a single signal line and wherein said means for damping the respective amplitudes of said clock pulses comprises:

means for placing said single signal line at a first voltage;

means for varying the respective amplitudes of the clock pulses transmitted from the programming apparatus to the user apparatus between said first voltage and a second, smaller voltage using a voltage limiting circuit; and means for identifying a data state when a reference voltage level is exceeded and for storing the data state until a next clock pulse in a shift register using a trailing pulse edge of each clock pulse.

20. A data transmission system as claimed in claim 15 comprising:

means for, after transmitting said programming data and said clock pulses from said programming apparatus to said user apparatus, transmitting a programming voltage pulse on said single signal line from said programming apparatus to said user apparatus.

21. A data transmission system as claimed in claim 15 comprising:

means at said user apparatus for, upon receiving said programming data and said respectively different clock pulses, operating on said respectively different clock pulses to produce further-varied clock pulses;

means at said user apparatus for transmitting said further-varied clock pulses from said user apparatus to said programming apparatus together with the programming data received by the user apparatus from the programming apparatus;

means at said programming apparatus for recovering said programming data transmitted from the user apparatus to the programming apparatus, as a confirmation of correct receipt at the user apparatus, using said further-varied clock pulses;

said means for producing said further varied clock pulses comprising means for producing said further-varied clock pulses by damping respective amplitudes of clock pulses at said user apparatus by respectively different amounts; and said means for recovering said programming data at said programming apparatus comprising means for recovering said programming data depending on the differently damped clock pulses sent to the programming apparatus from the user apparatus.

22. A data transmission method as claimed in claim 15 comprising means for producing said respectively different clock pulses by clock pulse frequency variation and wherein said single signal path comprises a single wireless transmission path.

23. A data transmission system as claimed in claim 22 wherein said means for producing said respectively different clock pulses using clock pulse frequency variation comprises:

means for superimposing a clock pulse frequency on a carrier frequency at said programming apparatus; and means, before transmitting said clock pulses from said programming apparatus to said user apparatus via said carrier frequency, for varying said clock pulse frequency.

24. A data transmission system as claimed in claim 22 wherein said means for producing said respectively different clock pulses using clock pulse frequency variation comprises:

means superimposing a clock pulse frequency on a carrier frequency at said programming apparatus; and means, before transmitting said clock pulses from said programming apparatus to said user apparatus via said carrier frequency, for superimposing a further clock pulse frequency on said clock pulse frequency.

25. A data transmission system as claimed in claim 22 wherein said means for producing said different clock pulses using clock pulse frequency variation comprises means for employing a frequency gating method for producing said clock pulse frequency variation.

26. A data transmission method as claimed in claim 16 comprising a plurality of user apparatuses to be programmed by said programming apparatus, each of said user apparatuses communicating with said programming apparatus via a respective single signal path;

each user apparatus having a receiver with at least a first address and a second address;

said programming apparatus comprising means for transmitting a signal from said programming apparatus to all of said user apparatuses at the respective first addresses for disenabling said user apparatuses and for transmitting a signal to the second address of a user apparatus to be activated and for subsequently transmitting said programming data and said clock pulses to said user apparatus to be activated, and for thereafter again disenabling said user apparatus to be activated after transmitting said programming data and said clock pulses.

27. A data transmission method as claimed in claim 1 wherein said user apparatus comprises a hearing aid.

* * * * *